L. F. STUMBAUGH.
STEERING WHEEL HAND WARMING DEVICE FOR AUTOMOBILES AND MARINE AND AVIATING MACHINES.
APPLICATION FILED JAN. 28, 1920.
1,380,604.
Patented June 7, 1921.
2 SHEETS—SHEET 1.
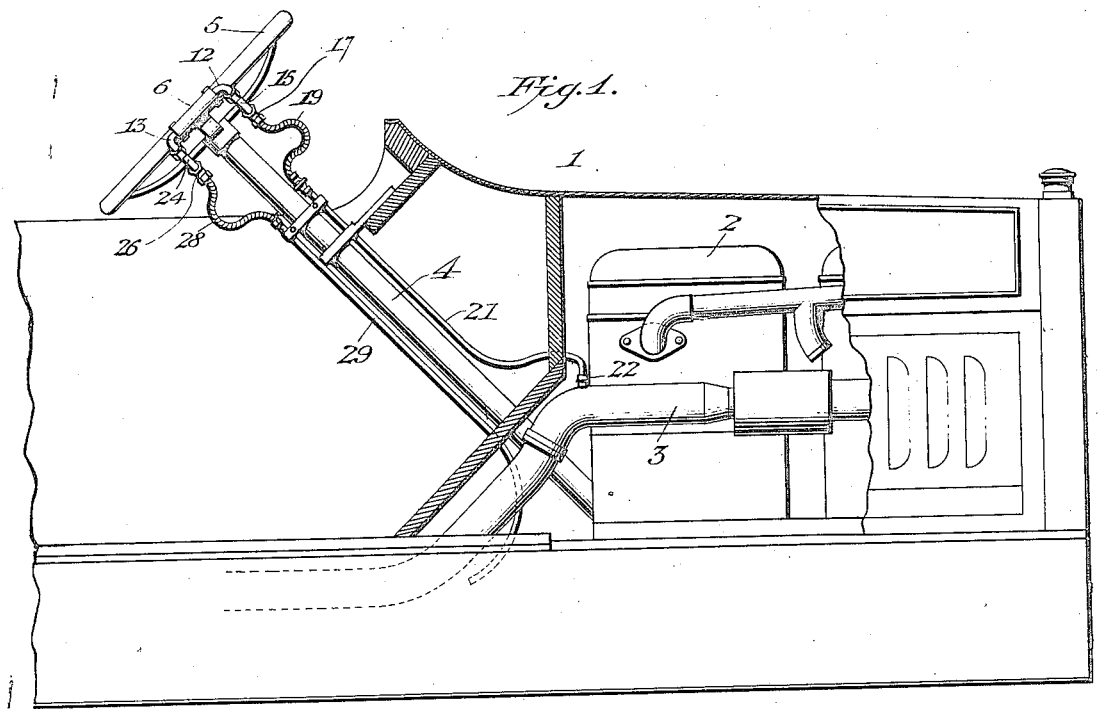
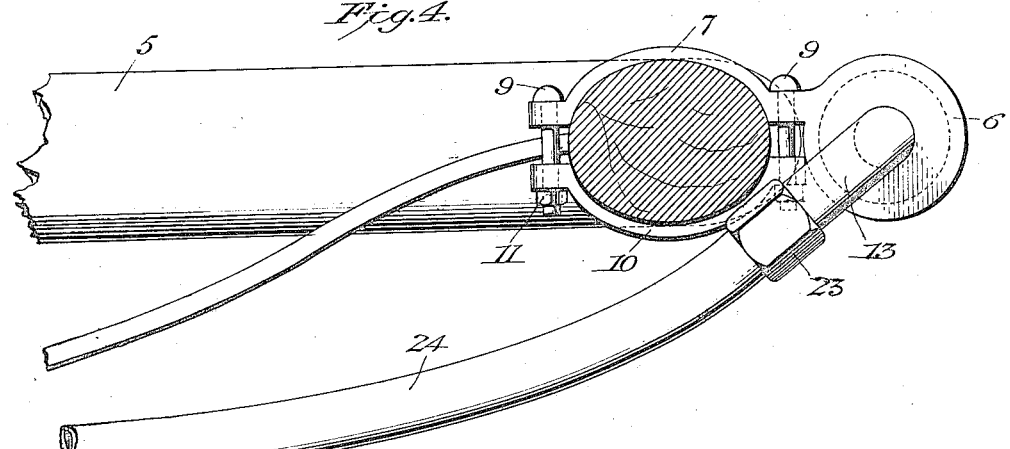
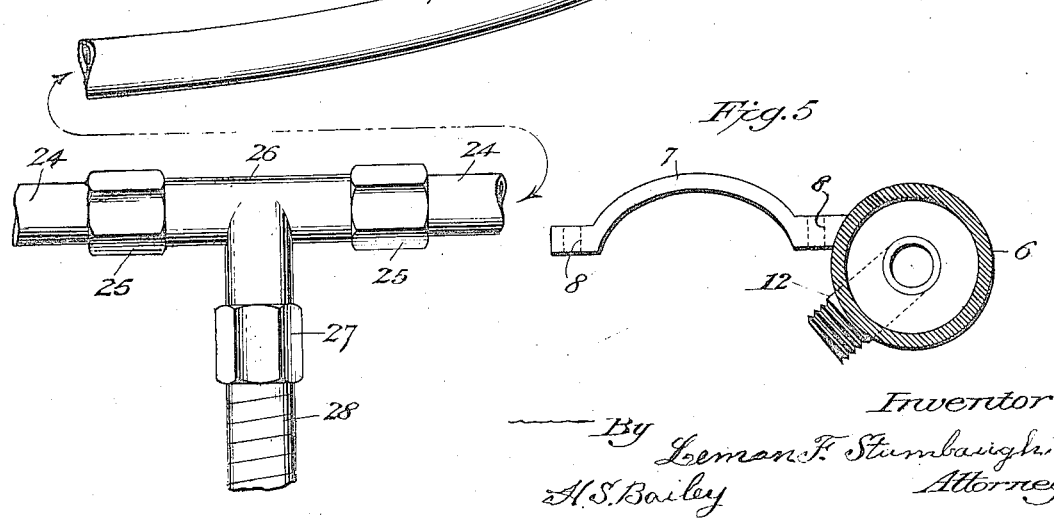
Inventor:
Leman F. Stumbaugh
By H. S. Bailey
Attorney L. F. STUMBAUGH.
STEERING WHEEL HAND WARMING DEVICE FOR AUTOMOBILES AND MARINE AND AVIATING MACHINES.
APPLICATION FILED JAN. 28, 1920.
1,380,604.
Patented June 7, 1921.
2 SHEETS—SHEET 2.
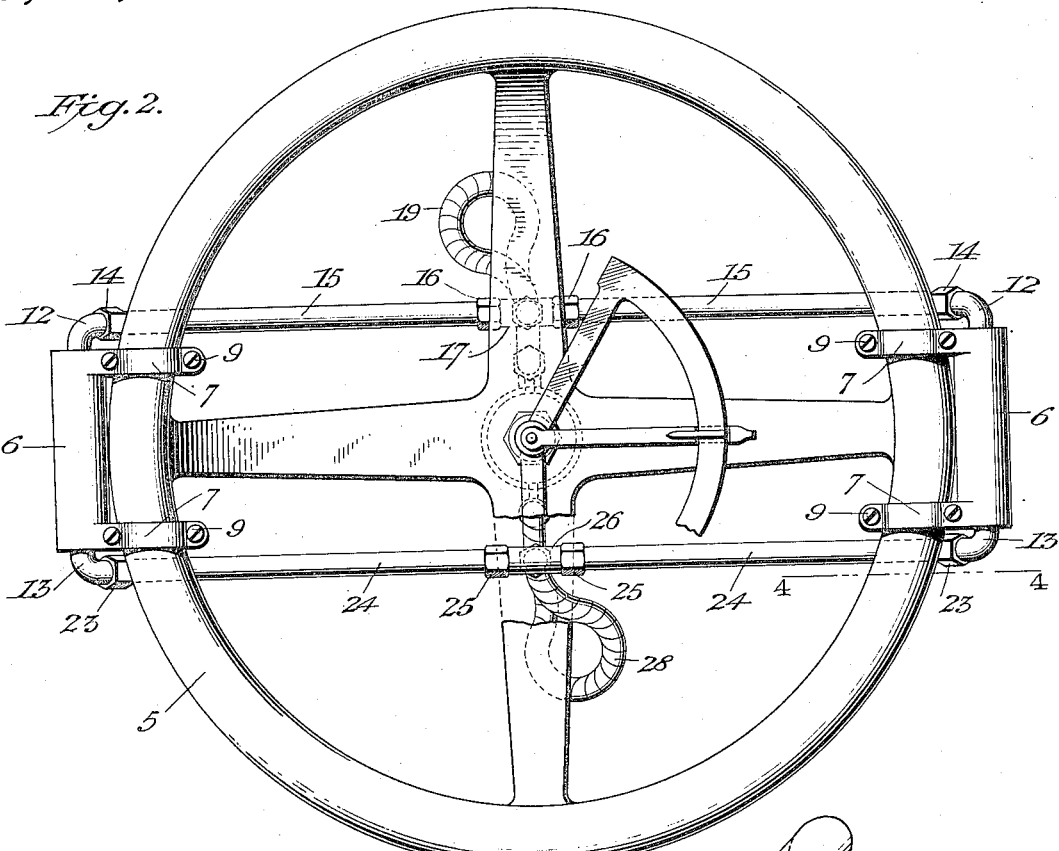
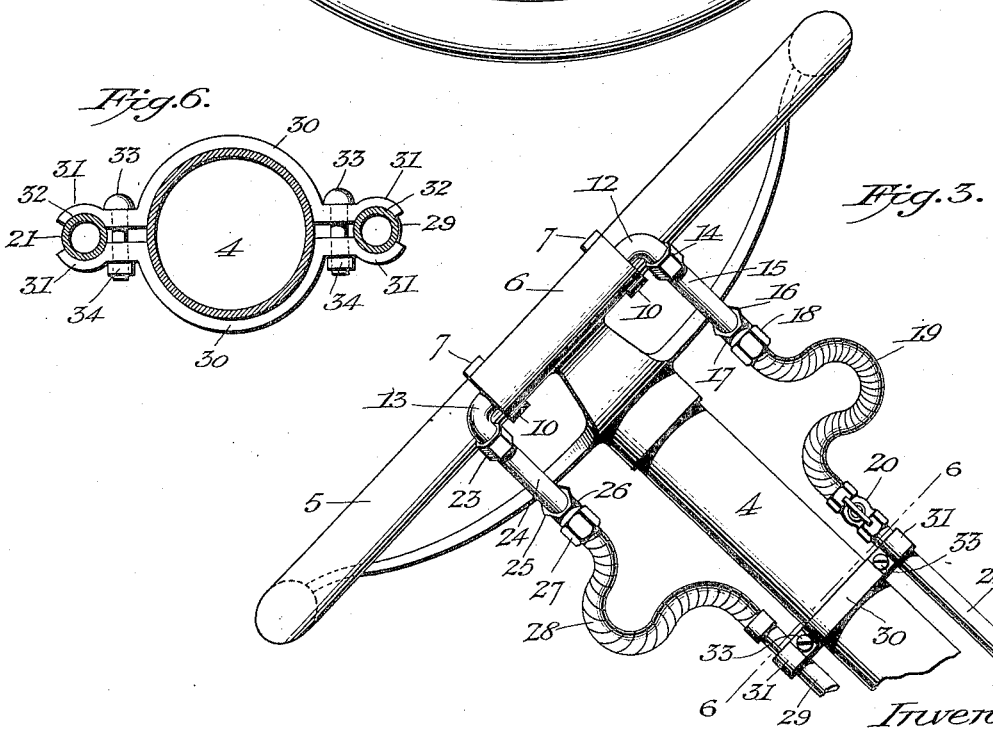

UNITED STATES PATENT OFFICE.

LEMAN F. STUMBAUGH, OF DENVER, COLORADO.

STEERING-WHEEL HAND-WARMING DEVICE FOR AUTOMOBILES AND MARINE AND AVIATING MACHINES.

1,380,604. Specification of Letters Patent. Patented June 7, 1921.

Application filed January 28, 1920. Serial No. 354,608.

*To all whom it may concern:*

Be it known that I, LEMAN F. STUMBAUGH, a citizen of the United States of America, residing at the city and county of Denver and State of Colorado, have invented a new and useful Steering-Wheel Hand-Warming Device for Automobiles and Marine and Aviating Machines, of which the following is a specification.

This invention relates to improvements in steering wheel hand warming devices for automobile and marine and aviating machines.

The main object of the invention is to provide a hand warming attachment for the steering wheels of all characters of engine propelled vehicles, which is heated by the exhaust from the engine of the vehicle.

Further, to provide a hand warming attachment for either steering wheels or steering levers of any form of engine propelled vehicles, in which the exhaust from the engine, whether steam or hot air or exploded gas, is utilized to heat the said hand warmer, means being provided for cutting off the heating medium from the said warmers.

Further, to provide a hollow hand warming attachment which is adapted to be detachably secured to the steering member of an automobile or like vehicle, which is connected by one tube with the exhaust pipe of the engine, and by another tube with the atmosphere, whereby a portion of the exhaust from the engine passes through the said attachment and thence to the atmosphere, the said tubes including flexible sections which permit turning of the steering member to the limit of its movement in either direction.

These objects are acomplished by the device illustrated in the accompanying drawings, in which:

Figure 1 is a sectional view of the forward portion of an automobile, showing the application of the improved hand warmers to the steering wheel of the said automobile.

Fig. 2 is an enlarged plan view of the steering wheel equipped with the hand warmers.

Fig. 3 is a side view of Fig. 2, showing the manner of connecting the hand warmers with pipes leading respectively to the exhaust pipe of the engine and to the atmosphere.

Fig. 4 is a sectional view—full size—on the line 4—4 of Fig. 2.

Fig. 5 is a transverse sectional view through one of the hand warmers; and

Fig. 6 is a sectional view on the line 6—6 of Fig. 3.

Referring to the accompanying drawings:

The numeral 1 indicates the forward portion of an automobile; 2, the engine; and 3 the exhaust pipe leading therefrom; 4, the steering post; and 5 the steering wheel, these parts being of common construction. The hand warmers 6, comprise two oppositely positioned tubular, handle-like members, about four inches in length, which are secured at opposite points on the steering wheel, and which are of approximately the same diameter as the felly of the said steering wheel. Upon each end of each tubular member 6, and extending at right angles thereto, is a substantially semi-circular clamping member 7, which rests upon the upper side of the felly portion of the wheel, and each member 7 is formed with bolt holes 8, through which are passed bolts 9, which also pass through holes in the end portions of similarly-shaped but detached clamping members 10, on the under side of the wheel, and receive nuts 11, which are screwed against the said members 10, thereby clamping the members 7 and 10 to the felly of the steering wheel, and thus securing the hand warming member rigidly upon the said wheel, as clearly shown in Fig. 4. An elbow 12, is screwed into one end of each hand warmer, and similar elbows 13, are screwed into their opposite ends.

The elbows 12, are connected by coupling nuts 14, to the adjacent ends of pipes 15, and the opposite ends of these pipes are connected by coupling nuts 16, to the opposite ends of a T coupling 17, and the third member of the T 17, is connected by a coupling nut 18, with one end of a section of flexible tubing 19, preferably spirally wound tubing, the other end of which is secured to a valve or cock 20, on one end of a pipe 21, the other end of which enters a coupling nipple 22, which is screwed into the exhaust pipe 3, of the engine.

The elbows 13, are also connected by coupling nuts 23, with the adjacent ends of pipes 24, the opposite ends of which are connected by coupling nuts 25, with the opposite ends of a T coupling 26, the third member of which is connected by a coupling nut 27, with one end of a spirally wound flexible tube 28, the other end of which connects with an outlet pipe 29, which extends down under the floor of the car and discharges into the atmosphere.

The T couplings 17 and 26, are midway between the elbows 12, and the elbows 13, respectively, and also lie beneath the spokes of the steering wheel, as shown.

The flexible tubes 19 and 28, are each considerably longer than the distance between their respective T couplings and the adjacent ends of the pipes 21 and 29, to which they are respectively connected, thereby permitting the steering wheel to be turned to the limit of its movement, in either direction. The upper ends of the pipes 21 and 29, are rigidly secured to the steering post 4, by clamps 30, comprising semi-circular members, the ends of which terminate in oppositely extending short arms 31, the opposing faces of which are formed with substantially semi-circular recesses 32, to engage the said pipes 21 and 29, and these clamps 30, are secured upon the steering post 4, and upon the pipes 21 and 29, by bolts 33, which pass through holes in the oppositely extending arms 31, between the said pipes and the steering post, and receive clamping nuts 34, as clearly shown in Fig. 6.

In operation, a portion of the exhaust, or exploded gas, passing out through the exhaust pipe 3, enters the pipe 21, and passes up to the T 17, and thence in opposite directions through the pipes 15 and elbows 12, to the hand warmers 6, which are thereby heated to a degree to keep the hands of the driver of the car warm and comfortable. From the hand warmers 6, the exhaust passes through the elbows 13, and pipes 24, to the T 26, and thence through the pipe 29, to the atmosphere.

By means of the valve 20, the supply of exhaust to the hand warmers can be so regulated as to give a uniform temperature to the said hand warmers, when the engine is running at either high or low speed, as, without the valve, the warmers will become too hot, when the engine is running at high speed, to be comfortably held by the driver of the car. In mild weather, when the hand warmers are not needed, they can be completely cut off from the exhaust, by the valve 20.

The construction and arrangement of the hand warming attachment is such that it can be easily and quickly installed, and at the close of the winter season, when its use is no longer required, it can be easily and quickly removed.

It will be noted that the initial cost of the device is the only item of expense connected with its installation, as the parts are practically indestructible, and will therefore last indefinitely.

The device is applicable to all classes of engine propelled vehicles, such as automobiles, airplanes and motor boats, in which either steam or internal combustion engines are used, as the exhaust in either case will accomplish the desired purpose.

Having described my invention, what I claim as new and desire to secure by Letters Patent, is:

1. A hand warming device for steering wheels comprising a pair of hollow hand grips attached to opposite sides of a steering wheel and lying outside of the same, an inlet pipe connecting similarly disposed ends of said hand grips, a T centrally located in said inlet pipe, an outlet pipe connecting the opposite ends of said hand grips, a T centrally located in said outlet pipe, means for supplying a heating medium to the T of said inlet pipe and comprising a section of flexible tubing and a valved pipe adapted to be connected to the exhaust pipe of an engine, and means including a section of flexible tubing and a pipe opening to the atmosphere for conducting the heating medium from the T of said outlet pipe.

2. A steering wheel hand warming device comprising tubular heating elements adapted to be attached to a steering wheel, clamping members integral with said tubular members and members coöperating therewith for clamping said heating elements to the opposite sides of a steering wheel, elbows screwed into the ends of said heating elements, said elbows forming inlet and outlet passages, respectively, for said heating elements, pipe connections including a T connecting said inlet elbows, and similar pipe connections including a T connecting said outlet elbows, a pipe adapted to be connected to the exhaust line of an engine, a manually controlled valve in said pipe, a second pipe opening to the atmosphere at a point distant from said steering wheel, means adapted to support said pipes on the post of said steering wheel and flexible connections extending, respectively, between said first pipe and the T of said inlet pipe connections and said second pipe and the T of said outlet pipe connections.

In testimony whereof I affix my signature in presence of two witnesses.

LEMAN F. STUMBAUGH.

Witnesses:
G. SARGENT ELLIOTT,
ELIZABETH SMITH.